United States Patent [19]
Dubroy

[11] Patent Number: 5,853,257
[45] Date of Patent: Dec. 29, 1998

[54] WIPER BLADE CONDITIONING SYSTEM

[76] Inventor: Gary Dubroy, 6397 Frederica Street, Niagara Falls, Ontario, Canada, L2G 1C5

[21] Appl. No.: 840,992

[22] Filed: Apr. 25, 1997

[51] Int. Cl.$^6$ .................................................. A47L 1/08
[52] U.S. Cl. .............................. 401/17; 401/10; 401/23; 401/27; 401/37; 401/137; 401/139
[58] Field of Search ............................... 401/34, 10, 137, 401/139, 17, 27, 23, 36, 24, 44, 45, 46, 47, 22, 37

[56] References Cited

U.S. PATENT DOCUMENTS 4,859,102  8/1989  Chamieh .......................... 401/24 X

*Primary Examiner*—Steven A. Bratlie

[57] ABSTRACT

A wiper blade conditioning system including a hand-held member comprised of an exterior portion and a cylindrical shaped interior portion. The interior portion has a hollow interior adapted to hold cleaning fluid therein. The interior portion is adapted for spraying the cleaning fluid. A plurality of cleaning elements are disposed within the exterior portion of the handheld member. The cleaning elements are adapted for cleaning windshields and conditioning wiper blades.

1 Claim, 3 Drawing Sheets

WIPER BLADE CONDITIONING SYSTEM

BACKGROUND OF THE INVENTION

1. Field of the Invention

The present invention relates to a wiper blade conditioning system and more particularly pertains to cleaning and conditioning used wiper blades and providing means to clean a windshield with a wiper blade conditioning system.

2. Description of the Prior Art

The use of wiper blade cleaners is known in the prior art. More specifically, wiper blade cleaners heretofore devised and utilized for the purpose of cleaning wiper blades are known to consist basically of familiar, expected and obvious structural configurations, notwithstanding the myriad of designs encompassed by the crowded prior art which have been developed for the fulfillment of countless objectives and requirements.

In this respect, the wiper blade conditioning system according to the present invention substantially departs from the conventional concepts and designs of the prior art, and in doing so provides an apparatus primarily developed for the purpose of cleaning and conditioning used wiper blades and providing means to clean a windshield.

Therefore, it can be appreciated that there exists a continuing need for new and improved wiper blade conditioning system which can be used for cleaning and conditioning used wiper blades and providing means to clean a windshield. In this regard, the present invention substantially fulfills this need.

SUMMARY OF THE INVENTION

In the view of the foregoing disadvantages inherent in the known types of wiper blade cleaners now present in the prior art, the present invention provides an improved wiper blade conditioning system. As such, the general purpose of the present invention, which will be described subsequently in greater detail, is to provide a new and improved wiper blade conditioning system and method which has all the advantages of the prior art and none of the disadvantages.

To attain this, the present invention essentially comprises a hand-held member comprised of an octagonally shaped exterior portion and a cylindrical shaped interior portion. The exterior portion has an opening therethrough extending from a top end through a bottom end thereof. The opening receives the interior portion therein. The exterior portion includes eight side panels. The interior portion has an open upper end and an open lower end. The open upper end removably couples with a dispensing spray. The open lower end has an end cap removably coupled therewith. The interior portion has a hollow interior that is adapted to hold cleaning fluid therein. Three branched dispensing tubes extend outwardly from the interior portion. Each of the branched dispensing tubes has an inner member extending in fluid contact within the hollow interior. An elongated vertical member is coupled with the inner member. The vertical member has a plurality of outer members extending outwardly therefrom. The outer members of each of the branched dispensing tubes extend outwardly of a different one of the eight side panels of the exterior portion. A first side panel of the exterior member of the hand-held member has a lubricant buffing pad removably coupled thereto. The first side panel receives the plurality of outer members of one of the branched dispensing tubes therethrough for fluid communication with the lubricant buffing pad. A second side panel of the exterior member of the hand-held member has a blade conditioning chamber formed therein. The blade conditioning chamber includes a pair of opposed brackets. The brackets have springs biasing the brackets towards each other. The blade conditioning chamber further includes an abrasive strip disposed between the pair of brackets. Each of the brackets has at least one guide roller disposed on an interior surface thereof. A third side panel of the exterior member of the hand-held member has a blade cleaning chamber formed therein. The third side panel receives the plurality of outer members of one of the branched dispensing tubes therethrough for fluid communication with the blade cleaning chamber. The blade cleaning chamber includes a recess extending within the third side panel. The recess has a sponge material disposed on the interior walls thereof. A fourth side panel of the exterior member of the hand-held member has a scouring pad removably coupled thereto. A fifth side panel of the exterior member of the hand-held member has a sponge pad removably coupled thereto. The fifth side panel receives the plurality of outer members of one of the branched dispensing tubes therethrough for fluid communication with the sponge pad. A sixth side panel of the exterior member of the hand-held member has an ice scraper pivotally coupled thereto. A seventh side panel of the exterior member of the hand-held member has a tissue dispenser coupled thereto. The tissue dispenser holds tissue paper therein. An eighth side panel of the exterior member of the hand-held member has a magnetic strip disposed thereon.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wiper blade conditioning system which has all the advantages of the prior art wiper blade cleaners and none of the disadvantages.

It is another object of the present invention to provide a new and improved wiper blade conditioning system which may be easily and efficiently manufactured and marketed.

It is a further object of the present invention to provide a new and improved wiper blade conditioning system which is of durable and reliable construction.

An even further object of the present invention is to provide a new and improved wiper blade conditioning system which is susceptible of a low cost of manufacture with regard to both materials and labor, and which accordingly is then susceptible of low prices of sale to the consuming public, thereby making such a wiper blade conditioning system economically available to the buying public.

Even still another object of the present invention is to provide a new and improved wiper blade conditioning system for cleaning and conditioning used wiper blades and providing means to clean a windshield.

Lastly, it is an object of the present invention to provide a new and improved wiper blade conditioning system including a hand-held member comprised of an exterior portion and a cylindrical shaped interior portion. The interior portion has a hollow interior adapted to hold cleaning fluid therein. The interior portion is adapted for spraying the cleaning fluid. A plurality of cleaning elements are disposed within the exterior portion of the hand-held member. The cleaning elements are adapted for cleaning windshields and conditioning wiper blades.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
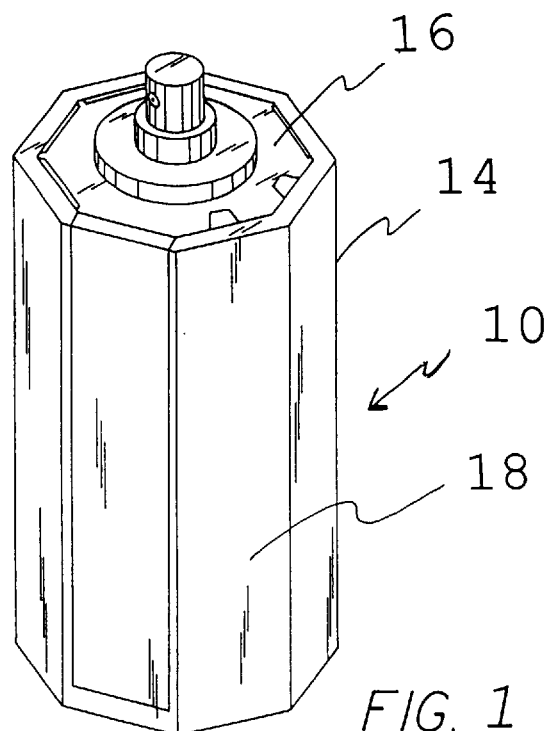
FIG. 1 is a perspective view of the preferred embodiment of the wiper blade conditioning system constructed in accordance with the principles of the present invention.
Figure 2:
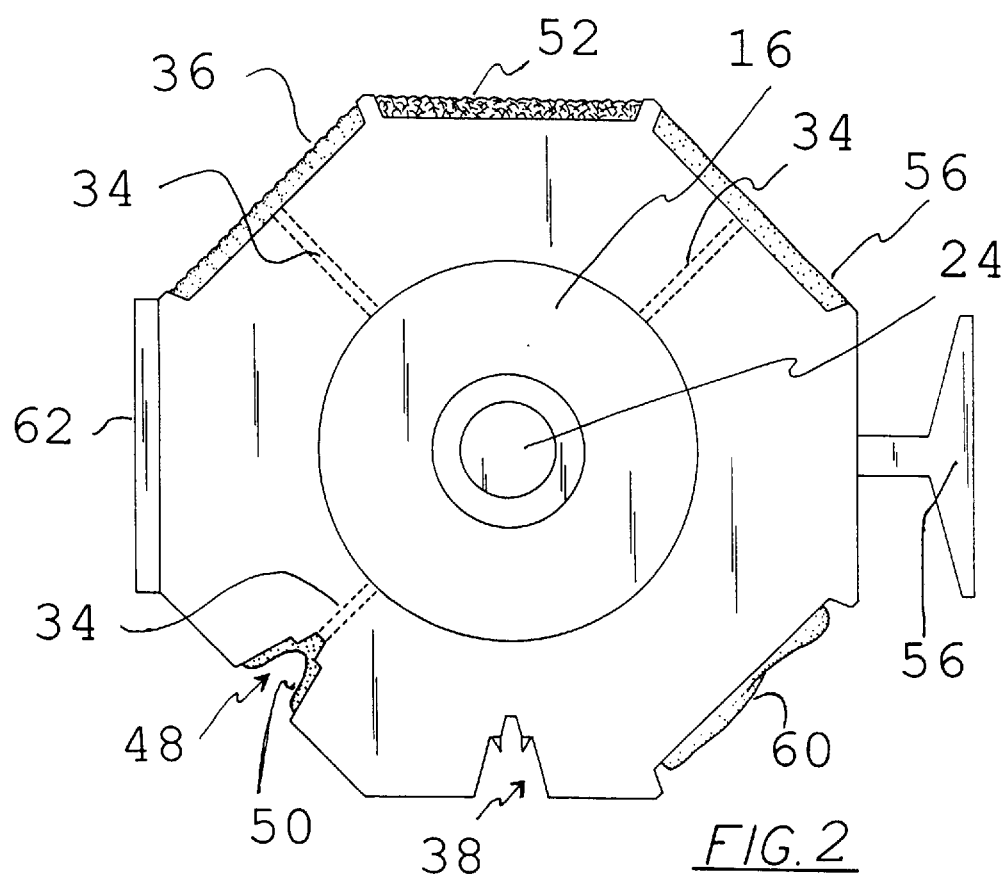
FIG. 2 is a top plan view of the preferred embodiment of the present invention.
Figure 3:
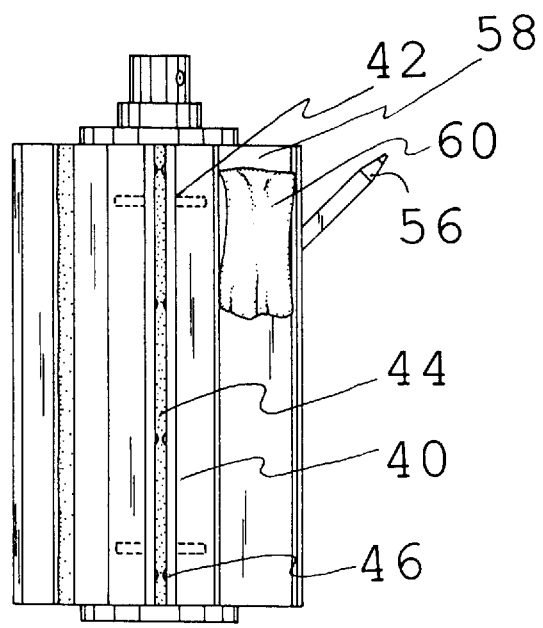
FIG. 3 is a side elevation view of the present invention illustrating multiple functions available.
Figure 4:
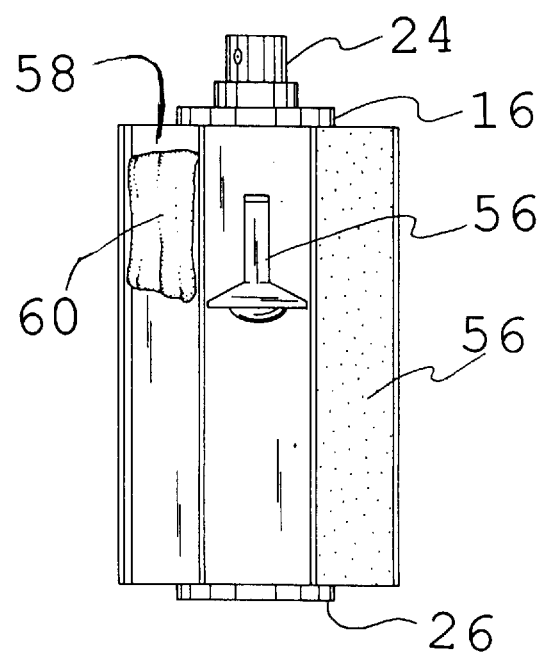
FIG. 4 is a side elevation view of the present invention as illustrated in FIG. 4 detailing alternate functions.
Figure 5:
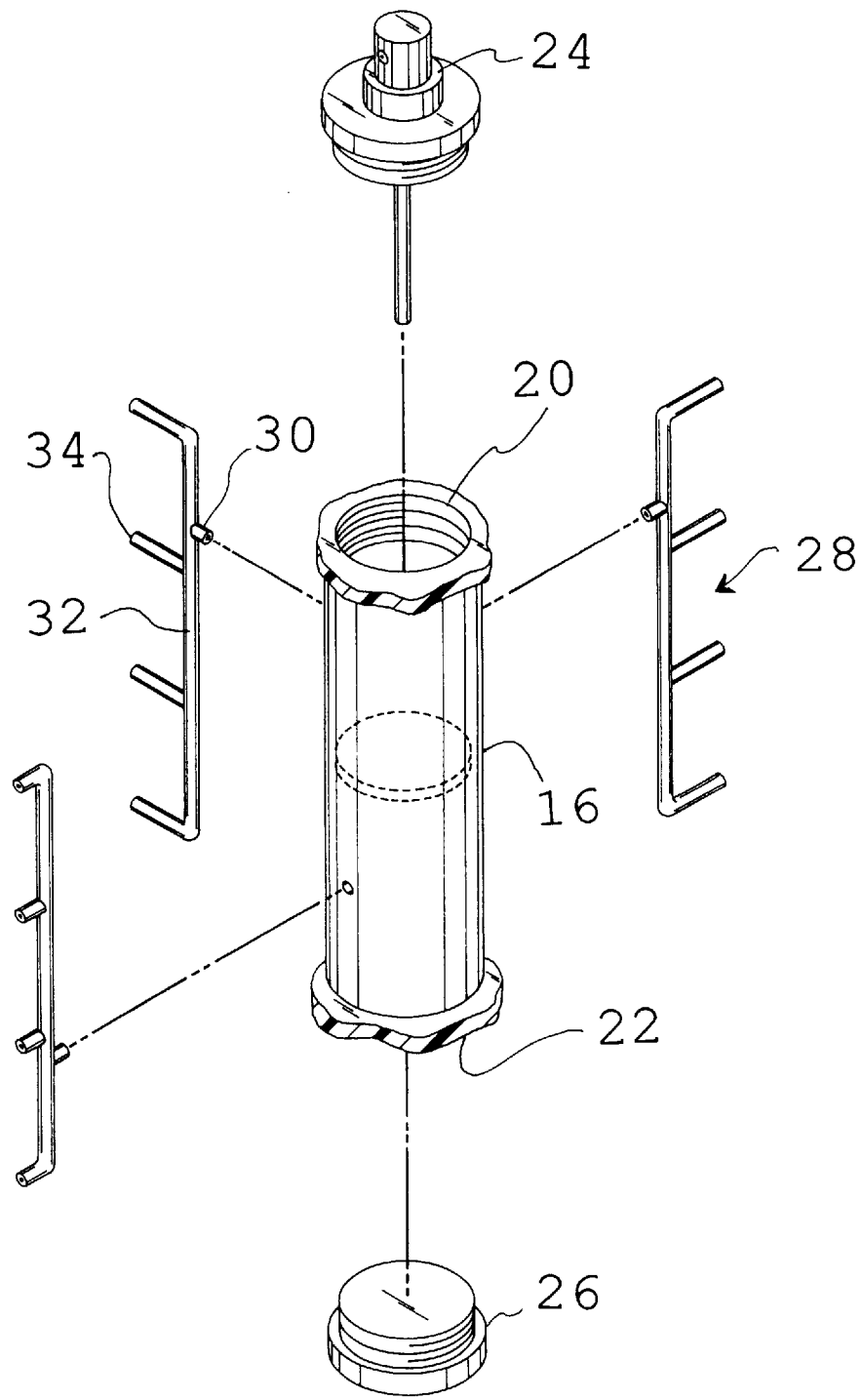
FIG. 5 is an exploded perspective view if the interior reservoir of the present invention.

With reference now to the drawings, and in particular, to FIGS. 1 through 5 thereof, the preferred embodiment of the new and improved wiper blade conditioning system embodying the principles and concepts of the present invention and generally designated by the reference number 10 will be described.

Specifically, it will be noted in the various Figures that the device relates to a wiper blade conditioning system for cleaning and conditioning used wiper blades and providing means to clean a windshield. In its broadest context, the device consists of a hand-held member and a plurality of cleaning elements for conditioning wiper blades and cleaning windshields. Such components are individually configured and correlated with respect to each other so as to attain the desired objective.

The system 10 includes a hand-held member 12 comprised of an octagonally shaped exterior portion 14 and a cylindrical shaped interior portion 16. The hand-held member is preferably 2 ½ inches wide and four inches high. This allows for storage within a glove compartment of a vehicle. The exterior portion has an opening therethrough extending from a top end through a bottom end thereof. The opening receives the interior portion therein. The exterior portion includes eight side panels 18. The interior portion has an open upper end 20 and an open lower end 22. The open upper end removably couples with a dispensing spray 24. The open lower end has an end cap 26 removably coupled therewith. The interior portion has a hollow interior that is adapted to hold cleaning fluid therein. The dispensing spray allows for the cleaning fluid to be sprayed onto an object to be cleaned, such as a windshield. Three branched dispensing tubes 28 extend outwardly from the interior portion. The dispensing tubes allows for fluid to be dispensed outwardly of the hollow interior. Each of the branched dispensing tubes has an inner member 30 extending in fluid contact within the hollow interior. An elongated vertical member 32 is coupled with the inner member. The vertical member has a plurality of outer members 34 extending outwardly therefrom. The outer members of each of the branched dispensing tubes extend outwardly of a different one of the eight side panels of the exterior portion. This allows the cleaning fluid to be dispensed to other cleaning elements which will be discussed in greater detail hereafter.

A first side panel of the exterior member of the handheld member has a lubricant buffing pad 36 removably coupled thereto. The first side panel receives the plurality of outer members of one of the branched dispensing tubes therethrough for fluid communication with the lubricant buffing pad. The lubricant buffing pad is the first and third steps in the process of reconditioning the wiper blades. The wiper blade is simply rubbed against the lubricant buffing pad.

A second side panel of the exterior member of the handheld member has a blade conditioning chamber 38 formed therein. The blade conditioning chamber includes a pair of opposed brackets 40. The brackets have springs 42 biasing the brackets towards each other. The blade conditioning chamber further includes an abrasive strip 44 disposed between the pair of brackets. Each of the brackets has at least one guide roller 46 disposed on an interior surface thereof. This represents the second step in the process of reconditioning the wiper blades. The pair of brackets will bias apart to allow the wiper blade to be inserted therebetween. The edge of the wiper blade is rubbed against the abrasive strip with the guide rollers facilitating the movement of the wiper blade. Once the wiper blade undergoes this step it is returned to the lubricant buffer for further conditioning.

A third side panel of the exterior member of the handheld member has a blade cleaning chamber 48 formed therein. The third side panel receives the plurality of outer members of one of the branched dispensing tubes therethrough for fluid communication with the blade cleaning chamber. The blade cleaning chamber includes a recess extending within the third side panel. The recess has a sponge material 50 disposed on the interior walls thereof. This represents the fourth and final step in the reconditioning of the wiper blade. The sponge material serves to wipe away any excess residue from the wiper blade prior to the blade being reused.

A fourth side panel of the exterior member of the handheld member has a scouring pad 52 removably coupled thereto. The scouring pad is used to remove bugs and other hard-stuck items from the windshield. As the scouring pad becomes worn, it is easily replaceable.

A fifth side panel of the exterior member of the handheld member has a sponge pad 54 removably coupled thereto. The fifth side panel receives the plurality of outer members of one of the branched dispensing tubes therethrough for fluid communication with the sponge pad. The sponge pad is utilized in spreading the cleaning fluid that is sprayed from the interior member, typically on the windshield.

A sixth side panel of the exterior member of the handheld member has an ice scraper 56 pivotally coupled thereto. The ice scraper is used to remove ice and snow from the windshield.

A seventh side panel of the exterior member of the hand-held member has a tissue dispenser 58 coupled thereto. The tissue dispenser holds tissue paper 60 therein.

An eighth side panel of the exterior member of the hand-held member has a magnetic strip 62 disposed thereon. The magnetic strip allows the device to be secured to any metal portion of the vehicle or within the glove compartment so that the system will not roll around in the glove compartment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by letters patent of the united states is as follows:

1. A wiper blade conditioning system for cleaning and conditioning used wiper blades and providing means to clean a windshield, in combination:

a hand-held member comprised of an octagonally shaped exterior portion and a cylindrical shaped interior portion, the exterior portion having an opening therethrough extending from a top end through a bottom end thereof, the opening receiving the interior portion therein, the exterior portion including eight side panels, the interior portion having an open upper end and an open lower end, the open upper end removably coupling with a dispensing spray, the open lower end having an end cap removably coupled therewith, the interior portion having a hollow interior adapted to hold cleaning fluid therein, three branched dispensing tubes extending outwardly from the interior portion, each of the branched dispensing tubes having an inner member extending in fluid contact within the hollow interior, an elongated vertical member coupled within the inner member, the vertical member having a plurality of outer members extending outwardly therefrom, the outer members of each of the branched dispensing tubes extending outwardly of a different one of the eight side panels of the exterior portion, the three branched dispensing tubes thus being in fluid communication with three of the side panels;

a first side panel of the exterior portion of the hand-held member having a lubricant buffing pad removably coupled thereto, the first side panel receiving the plurality of outer members of one of the branched dispensing tubes therethrough for fluid communication with the lubricant buffing pad;

a second side panel of the exterior portion of the hand-held member having a blade conditioning chamber formed therein, the blade conditioning chamber including a pair of opposed brackets, the brackets having springs biasing the brackets towards each other, the blade conditioning chamber further including an abrasive strip disposed between the pair of brackets, each of the brackets having at least one guide roller disposed on an interior space thereof;

a third side panel of the exterior portion of the hand-held member having a blade cleaning chamber formed therein, the third side panel receiving the plurality of outer members of one of the branched dispensing tubes therethrough for fluid communication with the blade cleaning chamber, the blade cleaning chamber including a recess extending within the third side panel, the recess having a sponge material disposed on the interior walls thereof;

a fourth side panel of the exterior portion of the hand-held member having a scouring pad removably coupled thereto;

a fifth side panel of the exterior portion of the hand-held member having a sponge pad removably coupled thereto, the fifth side panel receiving the plurality of outer members of one of the branched dispensing tubes therethrough for fluid communication with the sponge pad;

a sixth side panel of the exterior portion of the hand-held member having an ice scraper pivotally coupled thereto;

a seventh side panel of the exterior portion of the hand-held member having a tissue dispenser coupled thereto, the tissue dispenser holding tissue paper therein; and an eighth side panel of the exterior portion of the hand-held member having a magnetic strip disposed thereon.

* * * * *